United States Patent [19]

Németh et al.

[11] Patent Number: 4,885,846
[45] Date of Patent: Dec. 12, 1989

[54] METHOD AND APPARATUS FOR ADJUSTING THE WHEELS AND AXLES OF MOTOR VEHICLES

[75] Inventors: Istvan Németh, Szigethalom; Béla Simon, Budapest; István Németh, Szigethalom, all of Hungary

[73] Assignee: Gépjarmü Javitó Kisszövetkezet, Szigethalom, Hungary

[21] Appl. No.: 196,376

[22] Filed: May 19, 1988

[51] Int. Cl.$^4$ ............................................. G01B 5/255
[52] U.S. Cl. .................................................. 33/203.13
[58] Field of Search ............ 33/203.12, 203.13, 203.14

[56] References Cited

U.S. PATENT DOCUMENTS

| | | | |
|---|---|---|---|
| 4,443,551 | 4/1984 | Elsasser et al. | 33/203.13 |
| 4,631,832 | 12/1986 | Schrammen et al. | 33/203.12 X |
| 4,679,327 | 7/1987 | Fouchey et al. | 33/203.13 |

FOREIGN PATENT DOCUMENTS

| | | | |
|---|---|---|---|
| 0039201 | 3/1977 | Japan | 33/203.13 |
| 409077 | 4/1934 | United Kingdom | 33/203.13 |

*Primary Examiner*—Harry N. Haroian
*Attorney, Agent, or Firm*—Schweitzer & Cornman

[57] ABSTRACT

A method and apparatus is disclosed for precision adjustment of the suspension of motor vehicles, in which the wheels and axles are suspended with adjustable radius rods. All four wheels of the vehicle are supported by pairs of rollers carried by rotatable bases. The bases supporting the front wheels of the vehicles are mounted for lateral movement. Both the front and the back wheels are supported laterally by means capable of registering the force required to counteract any tendency of the vehicle to creep sideways when the wheel-supporting rollers are driven. Adjustments are first made to correct for any tendency for the vehicle to drift laterally. Measurements are then made at spaced points on the vehicle to determine the angle between its actual longitudinal center line and the ideal. On the basis of these measurements, the wheel track of the vehicle is also centered with respect to the vehicle. The invention enables an optimized adjustment to be achieved with great efficiency.

7 Claims, 4 Drawing Sheets

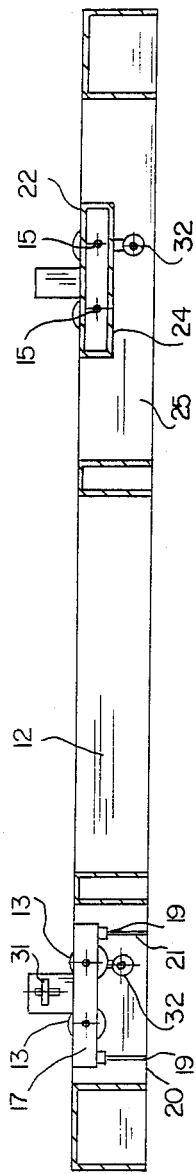
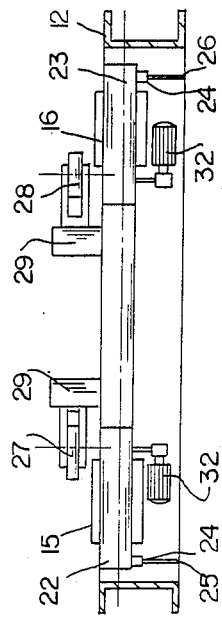
FIG. 3
FIG. 4

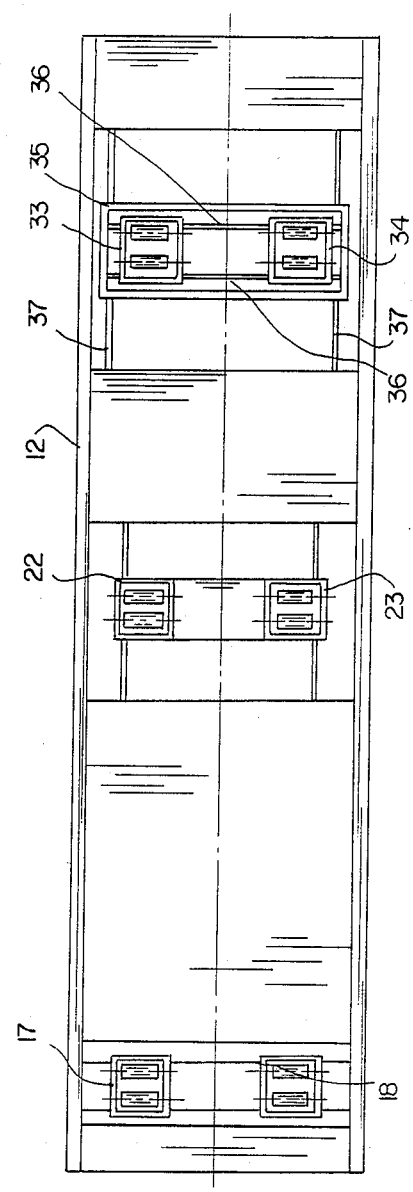

METHOD AND APPARATUS FOR ADJUSTING THE WHEELS AND AXLES OF MOTOR VEHICLES

BACKGROUND AND SUMMARY OF THE INVENTION

The invention relates to a method and apparatus by which erroneous adjustment of the running gear (i.e., the wheels and axles) of motor vehicles can be detected and corrected.

It is a well-known fact that proper adjustment of the fore running gear influences considerably the traffic safety of the vehicles and useful life of the tires as well. For this reason, the swivel pin angle of the fore running gear, castor angle, toe-in, wheel camber and clearance of the steering mechanism used to be controlled not only in course of production, but regularly and often in course of operation (swivel pin angle and wheel camber are to be controlled with independent wheel suspension only). For this purpose, several diagnostic apparatuses for motor vehicles have been developed. A part of these is based on a direct measuring principle, another part thereof on the indirect measuring principle.

The measuring apparatus is based on the principle of direct measuring, with which a rod measuring device is fixed onto the steered wheels, as it is described in German Pat. No. DE PS 2 935 899. With this solution, the rod overstates the failures and these are converted into electric signals in the sensors mounted thereon. Although this rod construction is absolutely accurate, it has not been used in a wide circle, as design and use are over-complicated.

The solution according to the Hungarian Pat. No. HU PS 177 659 discloses a similar construction. With this solution too, the measuring device is to be installed onto the wheel to be tested, however, for measuring the force needed for steering, a measuring steering wheel provided with a dynamometer used to be installed instead of the normal steering wheel.

For said reason, mostly measuring systems based on the indirect measuring method became more popular. These methods are preferred due to the fact that these apparatuses can be well combined with other complex diagnostic devices measuring other characteristics of the motor vehicle too. Such complex apparatuses are described in the patent No. GB PS 2 094 988 and German Pat. No. DE PS 28 01 855, respectively. According to the method described in those publications, the front wheels are arranged on rotatable bases, while the rear wheels are each put on a pair of rollers. On the rotatable bases, the clearance of the steering wheel can be measured, while rollers enable the measuring of the brake velocity and ability of acceleration. The complex apparatus is provided with a third measuring place for measuring lateral slip.

The rotatable base, as described in the German Pat. No. DE PS 27 517 661 enables the more accurate measuring of the steering mechanism. With this solution the wheel is put into a cradle instead of a flat knurled plate. The design of the measuring plate as described in the German Pat. No. DE PS 20 01 855 increases accuracy of measuring. The essence of the solution lies in that, the measuring plate is lying on several balls supported by springs.

The EP No. 0 124 258 represents another structural tendency. In this case, the fore wheels are also arranged on a pair of rollers. The advantage of said solution is that, in addition to geometric characteristics, brake effect can also be measured. Actual measuring requires a third roller between the two aforementioned rollers. Supporting rollers can be moved axially, enabling observations as the maladjustment of the steering rods.

Although the solutions described are able to demonstrate the examined conditions of the fore running gear with more or less accuracy, they cannot be considered as solutions meeting the requirements. The reason for this is that other, unmeasured problem condition failures may also occur with running gears. For example, errors of perpendicularity measured to the longitudinal axis of the motor vehicle, as well as errors of trace following and uniaxiality, influence traffic safety of the motor vehicle and useful life of the tires. Similar heretofore undiagnosed failures may occur at the fore running gear. This is of particular importance with motor vehicles, with which the geometry of the running gears is established by the radius rods only; as an example let us mention the autobuses with air springs.

Accordingly, the aim of our invention is to develop a method and an apparatus, respectively, with which all the faults of suspension of the running gears can be measured and eliminated.

The aim set for the invention can be achieved so that all the wheels of the motor vehicle are put onto measuring rollers and while rotating the rollers, the running gears are measured and, if necessary adjusted.

By feeding the data of the vehicle onto a computer, adjustment can be calculated with high accuracy, simultaneously considering the interaction of the different elements.

Accordingly, the invention relates to the determination of the relative positions of the running gears, in particular gears suspended from the vehicle by radius rods (Panhard rods), and adjustment in case of necessity. In the new procedure, all the wheels of the motor vehicle are put simultaneously onto supporting roller pairs, the axes of which extend perpendicular to the longitudinal axis of the motor vehicle occupying its ideal position. The rollers on the right and left sides are uniaxial, and at least one of the rollers of each of the pairs is put into rotation by means of an external force. The motor vehicle is supported externally on at least on two places along its longitudinal axis, preferably along the centerlines of the running gears. The magnitude and direction of the supporting forces are measured and if necessary are reduced to zero by the adjustment of the adjustable elements suspending the running gears. Thereafter the angle enclosed by the longitudinal axis of the vehicle and the axes of the rollers is determined by measurements, and the relative position of the midpoint of the wheel track and the longitudinal axis of the motor vehicle is measured. By regulating the adjustable elements suspending the running gear, eventually any existing difference between the longitudinal axis of the motor vehicle and the midpoint of the wheel track is eliminated, and the angle enclosed by the axes of the rollers and the longitudinal axis of the vehicle is set to ninety degrees.

In a preferred mode of realization of the method according to the invention, measuring (and in a given case adjustment) of all the running gears are carried out. Thereafter we measure the magnitude and direction of the lateral supporting forces arising in the axial support of the rollers arranged below the steered wheels. By regulating the elements defining the position of the steered wheels these supporting forces are reduced to zero.

In another mode of realization of the method according to the invention, all of the wheels of the motor vehicles provided with more than two axles, in particular wheels of articulated vehicles, are arranged on with each wheel a pair of rollers. Thereafter, starting from the fore axle, we measure the position of the running gears, and in cases of necessity adjustment is performed. With an articulated motor vehicle, the running gears in front of the articulation are measured and adjusted. Thereafter, advancing further behind the articulation, the positions of the running gears is measured for each axle and, if necessary, correction is performed. Next, we determine the position of the steered wheels to the rear of the articulation and, if necessary, adjustment is performed as well. Finally, the steering rod of the steered wheel behind the articulation and the steered fore wheels are adjusted.

With the third preferred mode of realization of the method according to the invention, the position of the steering wheel of the motor vehicle arranged on the rollers is adjusted until the supporting forces required for the axial support of the steered running gears is reduced to zero. Then the angular displacement of the steering wheel is measured.

In a further preferred mode of realization of the method according to the invention, representing the fourth version, the angle between the lateral and upright planes and the horizontal—serving as a basis of the position of the steer bolt—is measured and in a given case we adjust the castor angle of the running gear. Meanwhile we keep the aforementioned angle at a value of zero degrees and ninety degrees, respectively, in relation to the horizontal.

In a fifth version of the method according to the invention, the wheels of the motor vehicle are put onto roller pairs, the axes of which are perpendicular to the longitudinal axis of the motor vehicle occupying its ideal position. The relative position of the midpoint of the wheel track of the vehicle wheels and the longitudinal center axis of the motor vehicle is determined and in a given case the difference is eliminated by regulating the adjustable elements suspending the running gears. Thereafter, we measure the forces affecting the roller pairs axially and in the direction perpendicular thereto. In a given case, by regulating the adjustable elements suspending the running gears said forces are eliminated.

It is considered as advantageous if dimensional and tolerance data relating to the running gears of different motor vehicles are stored in a computer. Then, by the aid of the computer, measured data are compared with the data stored in the computer for said vehicle and, if necessary, the extent of regulation of the adjustable elements can be determined.

The invention relates also to the apparatus by which the relative positions of the running gears of a vehicle, in particular running gear suspended radius rods (Panhard rods), can be determined and steered wheels can be adjusted.

The apparatus is designed so as to have as many roller pairs, consisting of rollers of identical diameter, as the number of the wheels to be tested, the axes of all of the rollers are in the horizontal plane and run perpendicularly to the longitudinal axis of the vehicle occupying its ideal position on the apparatus. Rollers on the right and left side, respectively, are uniaxial. Within each pair of rollers, the distance between the rollers is less than the diameter of the vehicle wheels to be tested. Roller pairs are supported in bearings in rotatable bases, while the rotatable bases themselves are arranged on support enabling free guided motion. The rotatable bases carrying the fore running gear are able to move transversely on guide ways perpendicular to the longitudinal axis. Of the bases supporting the other running gear, those which carry wheels of the same sets of running gear are interconnected. They have a degree of freedom transversely along transverse guide ways and/or longitudinally along longitudinal guide ways. With every roller pair, at least one roller is in a driven connection with a drive operating at the same speed. The rotatable bases carrying at least the front wheels are supported in the direction of the axes of the rollers, in relation to the machine frame work. Between the rotatable base and the support elements are means for generating a signal according to the force effect. Between certain wheels, supporting rollers are mounted to prevent the wheels from moving laterally. The supporting rollers can be set transversely in relation to the machine frame and fixed thereto. Means may be inserted into the fixing elements emitting signals under force effect. Such means may be connected to a computer and/or display.

DESCRIPTION OF THE DRAWING

The invention will be described in detail by means of a preferred embodiment, by the aid of the accompanying drawings, wherein FIG. 1 diagrammatically illustrates the suspension of the running gears of an autobus.

FIGS. 3 and 4 are sectional views, as taken along lines 3—3 and 4—4, respectively, of FIG. 2.

FIG. 5 is a top view of a version having been developed for an articulated bus.

DESCRIPTION OF PREFERRED EMBODIMENTS OF THE INVENTION

Figure 1:
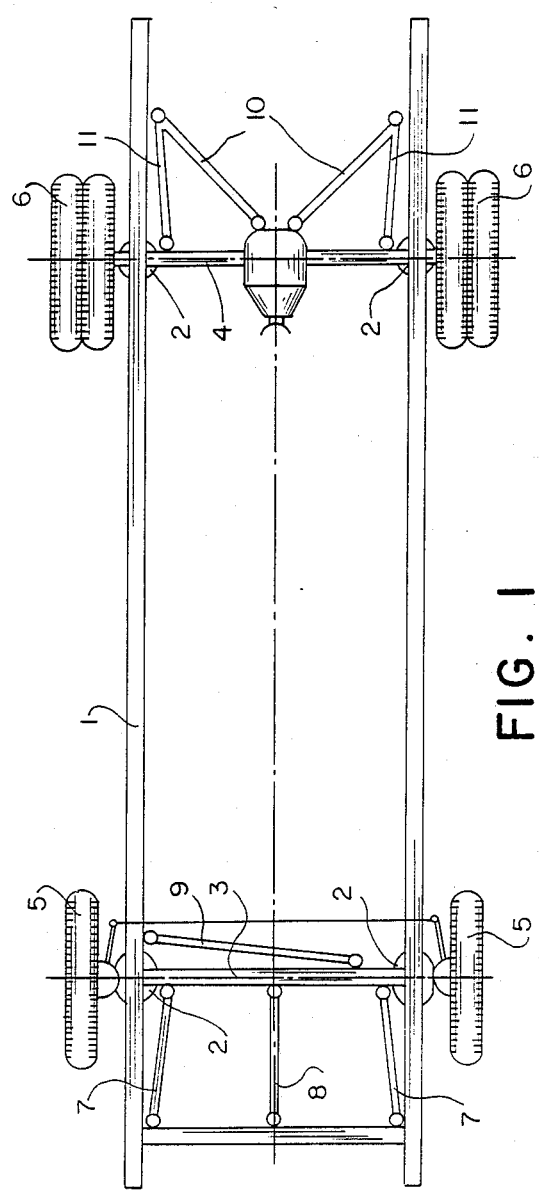

First of all, we applied the method according to the invention for bi-axial buses. The arrangement of the axles of the bus is to be seen in FIG. 1. The chassis 1 bears up against the rear axle housing 4 and the front axle 3 with air springs 2, while the axles are anchored to the chassis 1 by radius rods (Panhard rods) supported in ball and socket joints. The front axle is carried, in the plane below the centerline of the fore wheels 5, by two radius rods 7 and, in the plane above the centerline, by one radius rod 8 running parallel with the longitudinal axis of the chassis 1. Additionally, the fore axle 3 is anchored laterally to the chassis 1 by means of a radius rod 9. The rear axle housing 4 is carried, in the plane below the centerline of the rear wheels 6, by radius rods 11 and, in the plane lying above, by two radius rods 10. The radius rods 11, in the upper plane, are generally parallel with the longitudinal axis of the chassis 1, while the radius rods 10, in the lower plane, are directed at an angle to the longitudinal carriers of the chassis starting from the middle of the axle housing 4. The length of the individual radius rods can be regulated with a setscrew.

Figure 2:
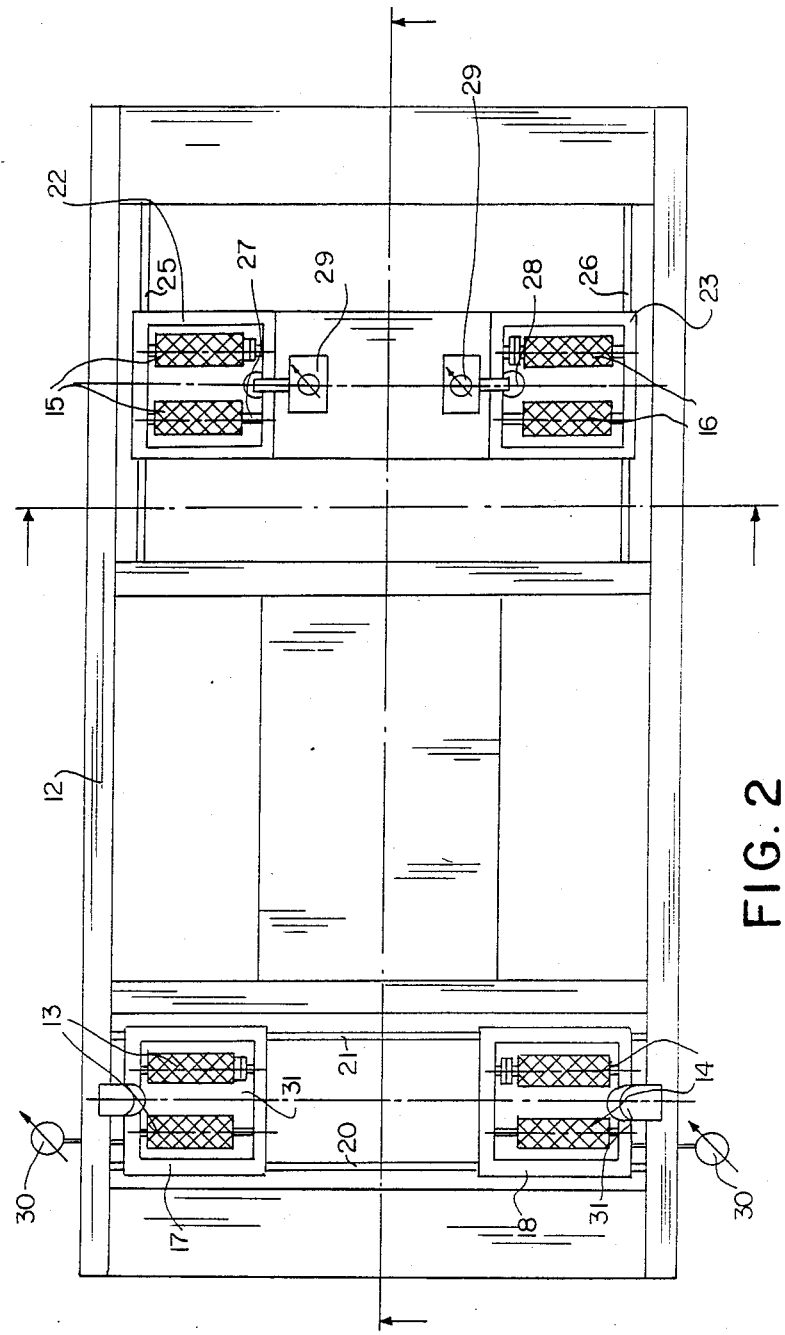
FIG. 2 is the top view of an apparatus according to the invention.

The apparatus for the implementation of the method according to the invention is to be seen in FIGS. 2 to 4.

In the framework 12, composed of strong steel beams, a plurality of roller pairs 13 to 16 with horizontal axes are arranged. The positions thereof correspond substantially to the positions of the fore wheels 5 and the rear wheels 6 of the autobus to be tested. The roller pairs 13 and 14 and the roller pairs 15 and 16, arranged on opposite sides of the longitudinal axis of the frame 12, consist of rollers with aligned axes, and these axes are perpendicular to the longitudinal axis of the frame 12.

The roller pairs 13 and 14 supporting the fore wheels 5, are supported in bearings separately in rotatable bases 17, 18. The rotatable bases are themselves supported on rails 20, 21 by anti-friction rollers 19. Rails 20 and 21 are mounted in the frame 12, perpendicular to the longitudinal axis of the frame.

The roller pairs 15 and 16, supporting the rear wheels 6, are also arranged in rotatable bases 22, 23. However, these are stiffly interconnected, in the transverse direction. They are carried by rails 25, 26 formed in the frame 12, by means of anti-friction rollers 24. The rails 25 and 26 are parallel with the longitudinal axis of the frame 12.

As is well-known, the distance between the rollers in the roller pairs is less than the diameter of the fore wheel 5 and rear wheel 6 of the bus to be tested. One roller out of every roller pair can be rotated through a vee-belt drive by an electromotor 32.

Mounted on the rear rotatable bases 22, 23, between the roller pairs 15 and 16, in the median plane between their axes, vertically disposed measuring rollers 27, 28 are arranged. Said measuring rollers 27, 28 are supported in bearings in measuring devices 29 by means of a lever, moving in the horizontal plane. Measuring device 29 measures the lateral force affecting the measuring rollers 27, 28, respectively. An electric signal, proportional with such lateral force, is generated here.

The rotatable bases 17 and 18, respectively, are movably connected to the frame 12, permitting movement in direction of the axes of the roller pairs 13, 14, through dynamometers 30. In the median plane of the axes of the roller pairs 13, 14, supporting rollers 31 with vertical axes are built onto the frame 12, these can be adjusted and fixed perpendicularly to the longitudinal axis of the frame 12.

Adjustment of the running gears of the autobus is carried out in the following way.

Fore wheels 5 are placed on the roller pairs 13 and 14, while the rear wheels 6 are placed on the roller pairs 15 and 16. The pressure of the tires must correspond to the prescribed value and, in case of necessity, the pressure is adjusted. Thereafter, we support the outer side of the fore wheels 5 by the aid of the support rollers 31 while the inner side of the rear wheels 6 are supported by the measuring rollers 27 and 28.

With the electromotor 32, we put the connected rollers into a rotary motion and therethrough the fore wheels 5 and the rear wheels 6. The number of revolutions should be selected so that a progress of 25 km/h of the bus should be simulated.

If the running gears are properly set, neither the measuring roller 27, 28 nor the dynamometer 30 will indicate a force deflecting laterally.

If the direction of the axle of the running gear is not perpendicular to the longitudinal axis of the frame 12, the rear axle housing 4 tends to wander in relation to the test frame 12, while the fore axle 3 tries to deflect the bases 17, 18. In this case, the length of the radius rods is to be changed until laterally directed forces are eliminated.

Thereafter, we control the perpendicularity of the axles of the running gears in relation to the longitudinal axis of the chassis. In consideration, that display of said axles would be rather complicated we chose an indirect way. As the axes of the roller pairs 13 to 16 are perpendicular to the longitudinal axis of the frame 12, we are measuring the relative position of the chassis 1 and the frame 12 by distance measurements, using the proper points as a basis. If necessary, by changing the length of the radius rods, said value is adjusted too.

Finally, using the previously described method, substantially by means of the earlier measurement we control whether there is a coincidence between the longitudinal axis of the chassis 1 and the midpoint of the wheel track. By adjusting the radius rods, this value can be set too.

With biaxial motor vehicles it is proposed to begin correction of maladjustments of the running gear, with which a more considerable fault could be found. After having adjusted the relative position of the gear to the chassis, adjustment of the steered fore wheels 5 is to be controlled. For this purpose, we measure separately the laterally arising forces on the roller pairs 13 and 14 with the dynamometers 30. If the two dynamometers 30 show different values, geometry of the steering wheel is to be adjusted.

In the ext step we control the clearance of the steering construction. For this purpose the steering wheel is to be rotated until the axial force on the roller pairs 13 and 14 below the steered fore axle 3 differs from zero. As soon as the dynamometers 30 show a force effect, we measure the angular displacement of the steering wheel.

Finally, we control the castor angle. In consideration that, with the autobus serving here as an example, steered running gears are built together in one single fore axle 3, castor angle can be corrected by tilting the fore axle 3. For this reason, it suffices to measure the angle enclosed by the productional basis reference plane of the fore axle 3 and the horizontal. If the angle measured deviated from the prescribed value, the angle can be adjusted by changing the length of the radius rod 8.

The apparatus as described was completed with a computer. All the data relating to the length of the radius rods and angular position were fed into the computer. We prepared the correlations between the faults of the running gears and the radius rods and these were also fed into the computer. After having fed the data of the measuring rollers 27, 28 and the dynamometers 30, the extent of the adjustment of all radius rods could be displayed on the screen of the computer.

The method according to the invention can be well used with articulated autobuses. However, this requires an apparatus which has a measuring place for the third axle. FIG. 5 illustrates this type of apparatus. It can be well seen that, in addition to the rotatable bases 17, 18, 22, and 23, further rotatable bases 33 and 34 are provided for. These can be moved on the rails 36 perpendicularly to the longitudinal axis of the frame 12. Rails 36 are fixed on the carriage 35 which itself can be moved on the rails 37 in direction of the longitudinal axis of the frame 12.

In this way, starting from the fore axle all the gears can be properly adjusted in the earlier described manner.

The apparatus according to the invention can be realized also that the bases can be displaced horizontally in two directions. As a consequence, the forces deflecting the movable bases can be measured in length and crosswise as well. For this purpose, it seems to be more advantageous to suspend the movable bases with flexible elements, e.g., with high strength wires onto the frame instead of supporting them in roller rows, as described previously. It goes without saying that possibility of adjustment in compliance with the axial distance of different motor vehicles is to be provided for. With the apparatus built up in this way the method can be realized more easily. First of all, faults between the longitudinal axis of the chassis and the wheel track of the running gears are to be eliminated. Thereafter the longitudinal axis of the chassis is to be oriented above the longitudinal axis of the apparatus. In the next step, adjustment can be carried out on basis of the data of the dynamometer.

From the examples presented here, difference in quality between the method according to the invention and earlier methods can be well seen. It becomes obvious that, while traditional methods control prescribed geometric dimensions, serving as a basis for supposed wear-free load of the tires and travel of the motor vehicle, we control the actual connection between the wheels and the soil, respectively. It goes without saying that the fault of any system of wheel suspension can be detected by using the method. However, faults are to be corrected in compliance with the given suspending system.

What we claim:

1. The method of determining the relative position of the wheels of a motor vehicle, in particular, wheels suspended with adjustable radius rods (Panhard rods) to the motor vehicle, and adjustment thereof if necessary, characterized in that
    (a) all the wheels of the motor vehicle are put simultaneously onto pairs of rollers, the axes of which extend perpendicularly to the longitudinal axis of the motor vehicle occupying the ideal position,
    (b) the rollers on the right and left sides are uniaxial,
    (c) at least one of the rollers of each pair of rollers is put into rotation by means of an external force,
    (d) the motor vehicle being supported laterally on both sides and at least on two places along its longitudinal axis,
    (e) the magnitude and direction of the lateral supporting forces being measured at said places,
    (f) said supporting forces being reduced to zero by the adjustment of the adjustable rods suspending the wheels,
    (g) thereafter measuring the angle enclosed by the longitudinal axis of the vehicle and the axis of the rollers,
    (h) measuring the relative position of the midpoint of the wheel track and the longitudinal axis of the motor vehicle, and
    (i) by regulating the adjustable radius rods suspending the wheels, eliminating the difference between the longitudinal axis of the motor vehicle and the midpoint of the wheel track and setting the angle enclosed between the longitudinal axis of the vehicle and of the rollers to 90°.

2. A method as claimed in claim 1, characterized in that
    (a) after measurement, and in a given case adjustment, of all the running gears has been carried out, measuring the magnitude and direction of the lateral supporting forces and, by regulating the elements defining the position of the steered wheels, reducing said forces to zero.

3. A method as claimed in claim 1 for adjusting an articulated vehicle, characterized in that
    (a) all the wheels of the articulated vehicles being arranged on individual pairs of rollers,
    (b) thereafter, starting from the fore axis, measuring the positions of the wheels and adjusting as necessary,
    (c) in the course of measuring and, if necessary adjusting, the wheels before the articulation, the positions of the steered fore wheels are determined,
    (d) thereafter, measuring and, if necessary correcting, the wheels behind the articulation position,
    (e) measuring and adjusting the positions of the steered wheels to the rear of the articulation, and
    (f) thereafter adjusting the steering rods of the steered wheels to the rear of the articulation and also of the steered front wheels.

4. A method as claimed in claim 1, characterized in that
    (a) the steering wheel of the motor vehicle arranged on the rollers being rotated until the supporting force in the axial support of the steered running gears differs from zero, and
    (b) thereafter measuring the angular displacement of the steering wheel.

5. A method as claimed in claim 1, characterized in that
    (a) the wheels of the motor vehicle are put onto roller pairs, the axes of which are perpendicular to the longitudinal axis of the motor vehicle occupying its ideal position,
    (b) the relative position of the midpoint of the wheel track and the longitudinal axis of the motor vehicle being determined and in a given case the difference is eliminated by regulating the adjustable elements suspending the wheels,
    (c) thereafter measuring the support forces affecting vehicle in the direction of the axes of the roller pairs, and
    (d) regulating the adjustable elements suspending the wheels as necessary until said forces are eliminated.

6. Apparatus for determining the relative position of wheels and axles on a vehicle, in particular wheels and axles suspended with radius rods (Fanhard rods), and for adjustment of the steered wheels, characterized in that
    (a) the apparatus has as many roller pairs, consisting of rollers of identical diameter, as the number of the wheels to be tested,
    (b) the axes of all of the rollers are in a horizontal plane and run perpendicularly to the ideal longitudinal axis of the vehicle to be tested,
    (c) corresponding rollers on the right and left side, respectively, being uniaxial,
    (d) within any pair of rollers, the distance between the rollers being less than the diameter of the wheel to be tested,
    (e) the roller pairs being supported in bearings in rotatable bases which are arranged on a frame enabling free motion,
    (f) at least one roller of each roller pair being in a driven connection with a drive means, each operating with the same number of revolutions,
    (g) support means for the rotatable bases carrying at least the fore wheels whereby said bases are supported for movement in the direction of the axes of the rollers in relation to the frame,
    (b) means associated with said support means and the rotatable bases for generating a signal under the stress of lateral pressure exerted by said vehicle and, (i) supporting rollers mounted on the frame for engagement with and lateral support of rear wheels of the vehicle and associated with an element generating a signal upon being stressed by lateral pressure exerted by said vehicle.

7. Apparatus as claimed in claim 6, characterized in that
   (a) the rotatable bases carrying the front wheels being movable only transversely on crosswise running guideways perpendicular to the longitudinal axis, and
   (b) the movable bases supporting the other wheels being mounted for movement longitudinally on longitudinal guide ways.